June 4, 1957  Q. G. RECCHIA  2,794,420
WASHING APPARATUS FOR MILKING INSTALLATIONS
Filed June 14, 1954  3 Sheets-Sheet 1
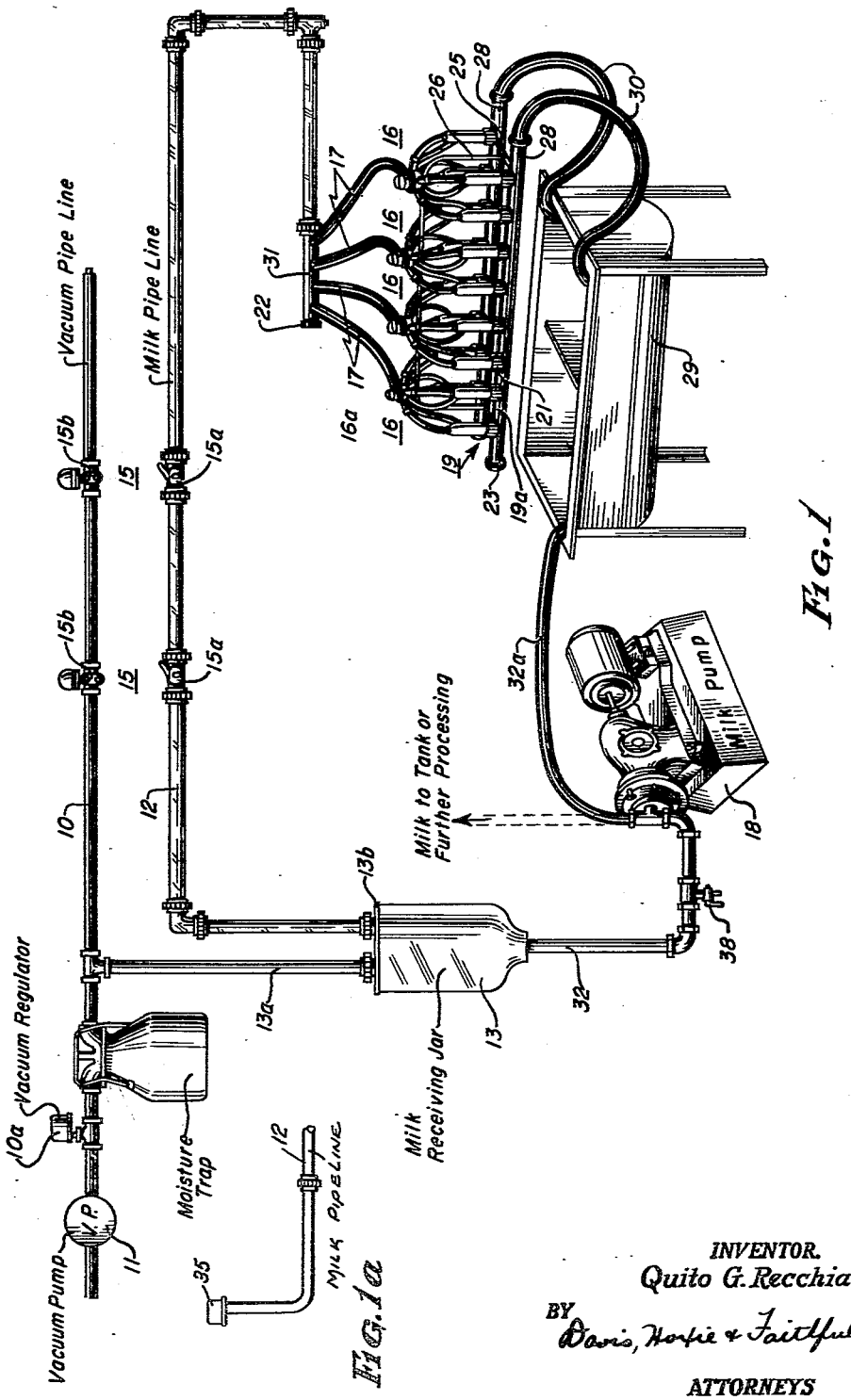
INVENTOR.
Quito G. Recchia
BY
Davis, Hoxie & Faithfull
ATTORNEYS

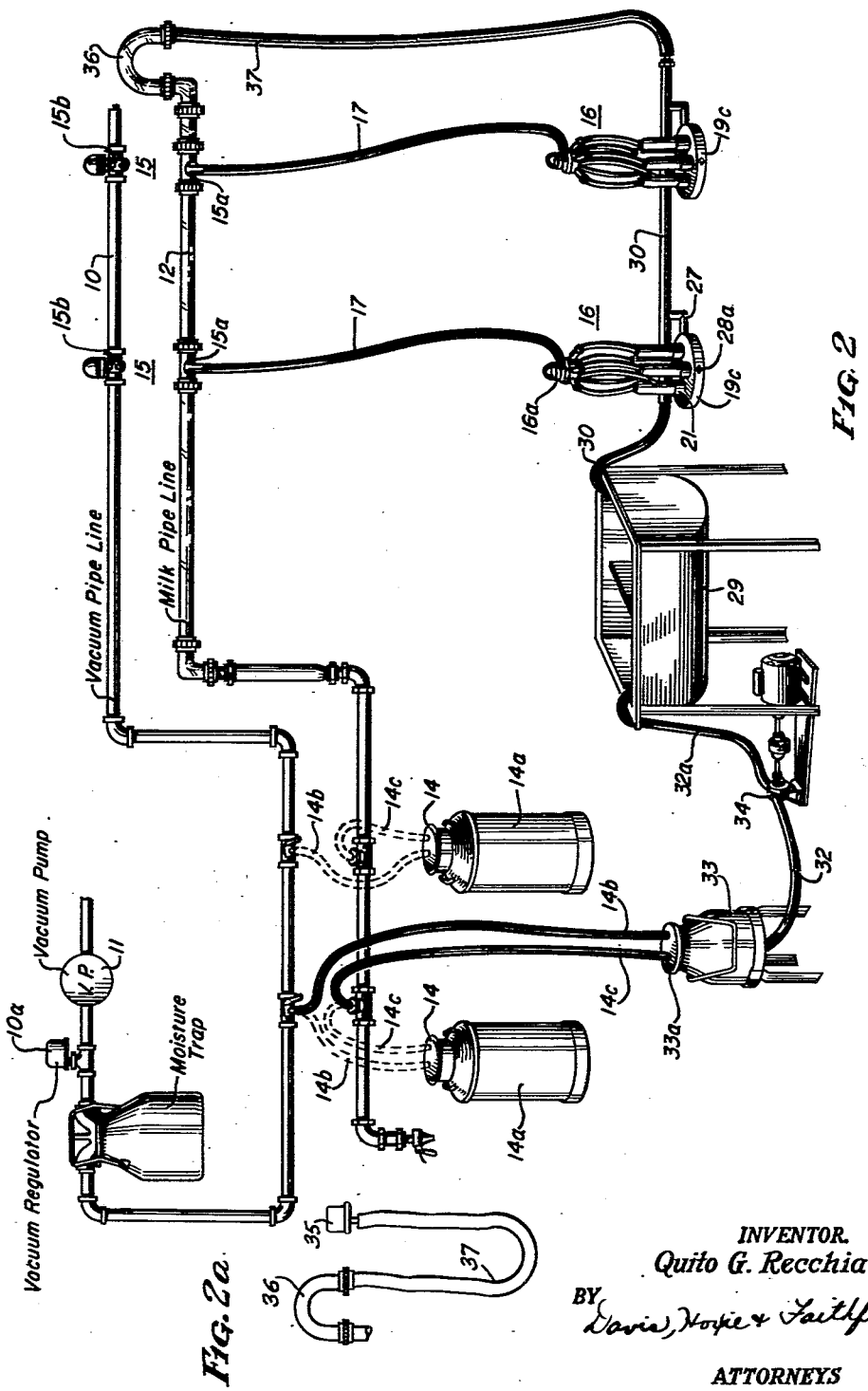

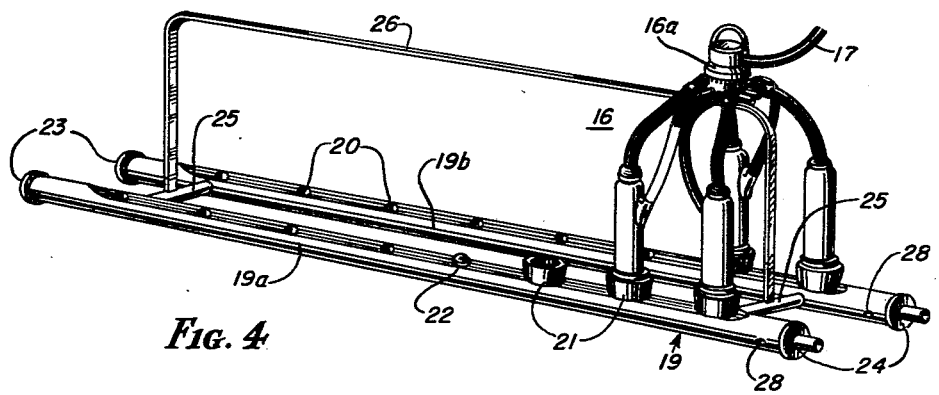
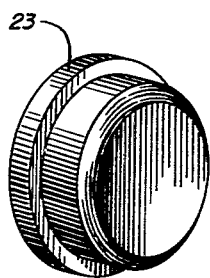
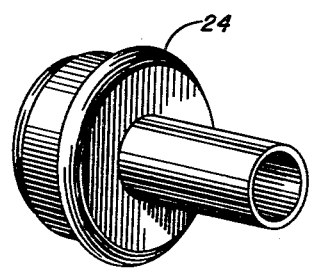
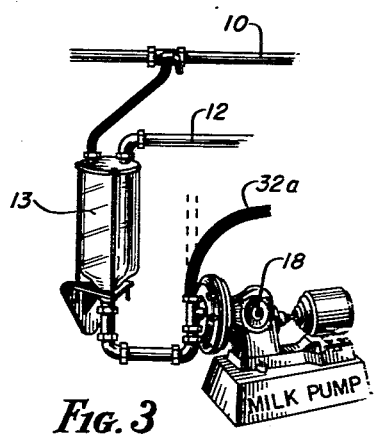
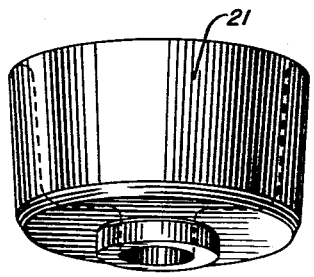

United States Patent Office 2,794,420
Patented June 4, 1957

2,794,420

WASHING APPARATUS FOR MILKING INSTALLATIONS

Quito G. Recchia, Wappingers Falls, N. Y., assignor to The De Laval Separator Company, Poughkeepsie, N. Y., a corporation of New Jersey Application June 14, 1954, Serial No. 436,571

7 Claims. (Cl. 119—14.18)

This invention relates to milking apparatus of the type in which the milk received from the teats of a plurality of animals is conveyed in a closed system to a receiving vessel or storage tank, and more specifically, to an arrangement for cleaning and/or sterilizing the milking apparatus.

In recent years, the pipe-line type milking apparatus such as disclosed in Hapgood Patent No. 1,846,805, has come into rather extensive use, as has a modification known as a milking parlor. In the general arrangement of a pipe-line milking system, the teat cup assembly of the milking apparatus is brought to a point conveniently adjacent to the animals, either individually or in pairs, and the milk therefrom is conveyed from the site of the milking operation by a common milk pipe to a milk receiving vessel or tank. In a milk-parlor arrangement, the animals to be milked are brought to a prearranged milking station from whence the milk is conveyed by a milk pipe to the milk tank. In both of these arrangements, the time and effort involved at the completion of the milking operations in disassembling each part and portion of the apparatus which has been in contact with the milk, in order that the same may be cleaned and sterilized, has been quite time-consuming and therefore a deterrent to a more general and universal acceptance of either of these milking systems.

Milking apparatus of the type with which the present invention is concerned comprises a milk pipe-line, a vacuum pipe-line, and one or more teat cup assemblies connected to the vacuum pipe-line, the teat cup assembly being operable to withdraw milk from an animal's teats and deliver the milk to the milk pipe-line through which the milk from each animal is conveyed to a milk-receiving vessel or storage tank located at a point removed and, in most occasions, somewhat remote from the site of the milking operation. Heretofore, it has been necessary at the completion of the milking operations to disassemble, clean and sterilize not only each individual part of each teat cup assembly but also each section of the long milk pipe-line. This manual operation is tedious and time-consuming to say the least.

Accordingly, it is an object of this invention to provide means in conjunction with milking apparatus of either the pipe-line type or milking parlor type, whereby all parts of the apparatus which have been in contact with the milk may be cleaned and sterilized without substantial disassembly of the apparatus.

An apparatus made according to the present invention comprises a wash tank containing a washing and/or sterilizing liquid (hereinafter referred to collectively as a cleaning liquid), and preferably divided into two sections; a manifold connected to the liquid supply in the wash tank and adapted to receive the open end of each of the teat cups of a standard teat cup assembly; a connection device or pipe whereby the milk tube of each of the teat cup assemblies may be connected to the milk pipe-line; and a further connection device or pipe whereby the tank end of the milk pipe-line is arranged to discharge into the wash tank. In order to insure positive circulation of the cleaning liquid throughout the system, a pump is preferably incorporated in the connection between the milk pipe-line and the wash tank. It is also preferable, in order to bring about extensive agitation of the cleaning liquid as it circulates throughout the system, to admit air in small amounts at one or more points in the system.

As will be seen from a reference to the aforementioned Hapgood Patent No. 1,846,805, standard milking apparatus installations include means whereby, when the apparatus is in operation, the milk pipe is maintained under sub-atmospheric pressure. The washing apparatus according to the present invention utilizes this feature as a means for its operation. Accordingly, at the conclusion of the milking operation, the vacuum pump is left running which, in turn, continues to maintain the milk pipe under sub-atmospheric pressure. The milk hose of each of the teat cup assemblies is connected to the milk line and the open ends of the teat cups are affixed to the manifold. Thus, with a connection made which leads from the wash tank to the manifold and a further connection made from the tank end of the milk pipe to the wash tank, a circulatory system is established through the so-arranged apparatus whereby the cleaning liquid in the wash tank passes through the milk contacted surfaces of the teat cup assemblies and throughout the entire length of the milk pipe-line.

Other objects and aspects of the invention will be apparent from the following description of the embodiments of the invention illustrated in the accompanying drawings, wherein:

Fig. 1 is an elevational view, partly in perspective, of one form of a complete installation according to this invention;

Fig. 1a is an elevational view of a portion of the installation of Fig. 1 showing a vacuum regulator which is used during the normal milking operation connected to the milk pipe-line;

Fig. 2 is a similar view of another form of the apparatus;

Fig. 2a is an elevational view of a portion of the installation of Fig. 2 showing a vacuum regulator which is used during the normal milking operation connected to the hose connection 37;

Fig. 3 is a perspective view of the milk-receiving jar and milk pump illustrated in Fig. 1, showing the fixed connection in place of the can fillers of the system illustrated in Fig. 2;

Fig. 4 is a perspective view of the washing manifold showing one complete teat cup assembly mounted at one of the plurality of washing stations thereon;

Fig. 5 is an enlarged perspective view of the teat cup mounting adaptor used at the various washing stations of the manifold;

Fig. 6 is an enlarged perspective view of the plug used in place of the adaptor shown in Fig. 5 at all of the teat cup washing stations not in use.

Fig. 7 is an enlarged perspective view of the manifold end plug, and

Fig. 8 is an enlarged perspective view of the nipple-bearing end plug used at the inlet end of the manifold.

The standard and usual milking apparatus installation as shown in Figs. 1 and 2 comprises a vacuum pipe-line 10 communicating with a vacuum pump 11, and a milk pipe-line 12 terminating in milk-receiving jar 13 (Fig. 1) or extending to can fillers 14 (Fig. 2). The milk receiver 13 of Fig. 1 is connected to the vacuum line through pipe 13a; and the cans 14a of Fig. 2 are connected to the vacuum line through hoses 14b, and to the milk line through hoses 14c. At intervals along the pipes 10 and 12 are milking stations 15.

The vacuum line 10 may be made up of ordinary iron pipe or any other type of piping available, since it is not in contact with the milk at any time. The degree of vacuum or sub-atmospheric pressure maintained in the vacuum line (usually 15 inches) may be conveniently controlled by a regulator valve 10a installed in the vacuum line adjacent the vacuum pump 11. The vacuum pump 11 may be any of the commercially available types marketed for this purpose. Those portions of the apparatus with which the milk is in contact are fabricated of stainless steel, glass or rubber, in order that they may be kept clean and sterile. However, it is preferred that the milk pipe-line 12 and the milk receiving jar 13, should the latter be included in the milking apparatus, be of a transparent material such as glass in order to make possible a constant visual check both during the normal and usual milking operation and during the washing operation according to this invention.

Each milking station 15 includes at least one teat cup assembly 16 to be affixed to an animal which it is desired to milk. During the milking operation, the milk hose 17 of each teat cup assembly is connected to the milk pipe-lins 12 via the usual valve fitting 15a at the milking station 15, and the usual vacuum hose (not shown) from the teat cup assembly 16 is connected to the vacuum pipe-line 10 through a pulsator-controlled valve 15b located at the same station. The valve 15b may be of the type disclosed in Hapgood Patent No. 1,854,305. The so-called claw 16a, by means of which the individual teat cups making up the teat cup assembly 16 are connected to the milk hose 17 and the vacuum hose, is disclosed in Lietch Patent No. 1,255,186. Through the means of the pulsator-controlled valve 15b and the claw 16a interconnected by the aforementioned hoses, the teat cups of each teat cup assembly 16 are caused to function in a known manner.

In the operation of the milking apparatus, the milk hose 17 and the vacuum hose (not shown) of one of the teat cup assemblies 16 are connected to the milk pipe-line 12 and the vacuum pipe-line 10, respectively, at one of the stations 15; and the teat cups are placed on the animal's teats. Since the pressure in the vacuum line 10 and the associated milk receiving jar 13 (Fig. 1) or cans 14a (Fig. 2) is reduced by the vacuum pump 11, the milk withdrawn from the animal by each of the teat cups in the assembly 16 flows through hose 17 to and through the milk pipe-line 12 and into the milk receiving jar 13 or the milk cans served by the can fillers 14. In the arrangement according to Fig. 1, a positive displacement milk pump 18 connected to the bottom of the milk-receiving jar 13 pumps the milk from the jar through a conduit 32 to a holding or storage tank (not shown) or to any other place for further processing.

The washing apparatus as illustrated comprises a manifold 19 which, as shown in Figs. 2 and 4, includes two parallel pipes 19a and 19b each having openings 20 arranged at intervals along the top thereof, which is flattened. In each opening 20 of the manifold there is placed either a teat cup mounting adaptor 21 (Fig. 5) or a plug 22 (Fig. 6) depending on the number of teat cups which it is desired to wash. As shown in Fig. 4, one end of each pipe 19a—19b is closed by a blind plug 23 (Fig. 7); and a nipple-bearing plug 24 (Fig. 8) is inserted in the other end of each pipe. An air admission hole 28 forming an air inlet is provided in each manifold pipe near the nipple carrying end of the manifold. The side-by-side arrangement of two manifold pipes 19a—19b makes it more convenient to wash the usual four teat cup assembly, using each pipe to accommodate two of the four cups of each assembly. The manifold pipes are held in spaced relation by cross-connections 25 near the pipe ends. A U-shaped bracket 26 may be mounted on the cross-connections, as shown in Fig. 4, and used to support the teat cup assemblies in an inverted position.

In the apparatus shown in Fig. 2, the manifold 19c is fabricated as a flat hollow disc, the upper face of which has openings similar to the openings 20 and adapted to receive either teat cup mounting adaptors 21 or plugs 22 as in the Fig. 4 embodiment. In this form of the manifold, a nipple 27 communicates with the interior of the manifold and an air admission hole or air inlet 28a is likewise provided. While the opening 28a is shown at the side of manifold 19c, it can be formed in the bottom or base, which has the advantage that the bottom of the manifold can be arranged for draining the manifold through the opening.

The nipple connection 24 or 27 forms a liquid inlet of the respective manifolds 19 and 19c is connected to a wash water supply, which may be conveniently made available from a supply tank 29 through connection means 30 in the form of flexible conduits. The milk hoses 17 from the teat cup assemblies 16 are then attached to the milk pipeline 12 through a hose manifold or multiple nipple connection means 31 as shown in Fig. 1, or they are left attached to the milk pipe-line 12 in their normal milking positions as shown in Fig. 2.

In the arrangement shown in Fig. 1, the milk pump 18 normally used in the system is included in the washing circuit, where it is cleaned by the washing liquid and functions to return the washing liquid from the milk receiver 13 (where the fluid is under sub-atmospheric pressure) to the wash tank 29. As shown in Fig. 1, the pipe-line 32 which normally conveys the milk from receiver 13 to storage or further processing has a flexible part 32a for connecting the pump 18 to the wash tank 29.

In the arrangement according to Fig. 2, the washing circuit includes a sealed can or receiver 33 connected to the vacuum and milk lines 10 and 12 through the hoses 14b and 14c, respectively. Thus, the can 33 replaces the milk cans 14a. A small circulating pump 34 is inserted in the conduit 32a for the purpose of conveying washing liquid from the bottom of can 33 to the wash tank 29.

An installation of a pipe-line milker generally includes a second vacuum regulator located at the end of the milk pipe-line furthest removed from the vacuum pump. Such a second vacuum regulator is shown at 35 in Figs. 1a and 2a. In order to assure a bleeding of air into the milk pipe-line (and thus assure the agitation and travel of the milk to the milk receiver jar 13 or the can fillers 14) this vacuum regulator 35 is adjusted to a slightly lower sub-atmospheric pressure, in the order of 12" to 13", than the first regulator 10a heretofore mentioned. During the washing operation, the second regulator 35 is disconnected from the system and the air intake is through the holes 28 adjacent the point of entry of the washing liquid to the manifolds 19 or 19c. In this way an agitated flow of the washing liquid is assured throughout the entire circuit.

In the form of the invention shown in Fig. 1, the normal connection for the regulator 35 is closed by one of the plugs 22 during the washing operation. In the arrangement according to Fig. 2, the hose connection 37 from the milk pipeline 12 is transferred from the regulator 35 to the pipe 30 to accomplish the same purpose. Thus, the plug 22 in Fig. 1 and the transferable hose connection 37 in Fig. 2 each constitute a means for rendering the vacuum regulator 35 inoperative to bleed air into the milk pipe-line 12.

In the Fig. 2 embodiment, it is advantageous to provide an inverted U-section 36 at the far end of the milk pipe-line 12. With this arrangement, the washing liquid builds up in the connection 37 in the form of slugs which are syphoned or drawn over the top of the U-section 36 at intervals (in contrast to a steady stream), thus further increasing the agitation in the flowing wash liquid. It also assures that, at intervals at least, a sufficient volume of washing liquid will be going through the milk pipe-line 12 to contact and clean all of the inner surface of the pipe. During the milking operation, when only air passes through this U-section of the pipe, the latter does not change any characteristic of the system. Accordingly, the U-section 36 need not be removed but can remain as part of the permanent installation.

In the form of the invention shown in Fig. 1, the inverted U-section 36 has been omitted from the milk pipe-line, since the throughput of washing liquid moving toward the milk pipe-line 12 from the relatively large manifold 19 and the plurality of teat cup assemblies 16 is sufficient to fill and wash the line.

When the milking operations have been completed and the connections between the washing apparatus and the permanent milking system have been arranged as heretofore described and shown in the drawings, the teat cup assemblies are brought to their washing station and mounted in an inverted position on the manifolds 19 or 19c, with the open teat-receiving ends of the teat cups inserted in the teat cup mounting adaptors 21. All unused manifold openings 20 are then closed with plugs 22. Cool water from the wash tank 29 is then circulated through the milk-conducting parts of the installation for rinsing purposes, as will be described in greater detail presently, and the system is drained. Next, a detergent solution is made up in tank 29 and circulated for a period through the system, after which it is drained off. The third step comprises a period of circulation of a hot sanitizing solution through the system which, at the completion of the circulation period, is drained off or left standing in the system for some time, in accordance with the desired practice. Of course, if allowed to remain in the system, the sanitizing solution must be drained off prior to the next milking operation. During the period while the detergent solution is circulating in the system, the stall cocks 15a at the milking stations may be opened one at a time and brushed clean. A drain cock, such as shown at 38, is provided at the low point of the permanent milking system to aid in draining the same.

By providing the wash tank 29 with two sections, the various solutions to be circulated may be made up in advance of their need. For instance, while the rinse water is being circulated from one section of the tank, the detergent solution may be made up in the other.

In the operation of the washing system according to Fig. 1, after the teat cup assemblies have been mounted on the manifold 19, and the vacuum pump 11 and the milk pump 18 have been started, liquid is drawn from tank 29 (due to sub-atmospheric pressure established in the system by the vacuum pump) through connections 30 into the manifold pipes 19a and 19b. From there, it is drawn up through the openings 20 of the manifolds into each of the teat cups and their associated passages in the claw 16a, through the milk hoses 17, and then into the milk pipe-line 12. After moving through the milk pipe-line 12, the liquid passes into the milk receiver jar 13, and is withdrawn from there via pipe 32 by the milk pump 18 and returned through conduit 32a to the wash tank 29. Agitation and turbulence of the moving liquid is established and maintained by the admission of air through ports 28 at or near the point of entry of the liquid into the manifolds 19.

In the system according to Fig. 2, the flow of liquid is from tank 29 through connection 30 into the individual manifolds 19c in parallel. The liquid is then drawn up through the teat cup assemblies and delivered to the milk pipe-line 12 via the milk hoses 17. A branch connection between pipe 30 and the milk pipe-line 12 is formed by hose 37, in order to deliver an adequate supply of the liquid to fill the milk pipe-line. After passing through the pipe-line 12, the liquid goes into the sealed can or jar 33 and is withdrawn from there via the auxiliary pump 34 and returned to the tank 29. In this arrangement, agitation and turbulence of the moving fluid is established and maintained by the admission of air through ports 28a in the individual manifolds 19c.

It will be apparent that in Fig. 1 the pipe 13a and the sealed top 13b of receiver 13, through which the pipes 13a and 12 are connected to the interior of the receiver, constitute means for interconnecting the milk and vacuum pipe-lines through the receiver, so that the sub-atmospheric pressure in pipe 10 draws cleaning liquid from the tank 29 through the manifold 19, the teat cup assemblies 16 and the milk pipe-line 12. In Fig. 2, such interconnecting means are formed by hose lines 14b—14c and the sealed top 33a through which they are connected to the interior of receiver 33, the receiver in this case being a vessel which does not normally form a part of the milking installation but replaces the milk cans 14a as an interconnection between the milk and vacuum pipe-lines, during the cleaning operation. The return conduits 32—32a, and the pumps 18 and 34 of Figs. 1 and 2, respectively, constitute means for returning cleaning liquid from the receiver 13 or 33 to the tank 29.

From the foregoing description, it will be seen that an arrangement has been provided whereby the time-consuming manual labor involved in disassembling the component parts of a pipe-line milking apparatus has been avoided. By a few changes in connections between component parts of the standard milking apparatus, to include the manifolds herein disclosed, a continuous circulating system has been formed which includes the parts of the milking apparatus contacted by the milk during the milking operations. Thus, it is no longer necessary to take apart and separately clean the elements which make up the teat cup assemblies and other components of the system.

I claim:

1. In a pipe-line milking installation having a milk pipe-line, at least one teat cup assembly including a plurality of teat cups and a hose for connecting the cups to the milk pipe-line, and a vacuum pipe-line for connection to the milk pipe-line for drawing milk into and along the milk pipe-line from the teat cups by way of the hose, a washing apparatus comprising a tank for a cleaning liquid, a manifold having a plurality of openings adapted for connection to the teat cups and also having a liquid inlet and a small air inlet opening adjacent the liquid inlet end of the manifold, a conduit for connecting the tank to the manifold inlet, a liquid receiver, and means for interconnecting said pipe-lines through the receiver whereby the sub-atmospheric pressure in the vacuum pipe-line draws cleaning liquid from the tank through said conduit, manifold, teat cups, hose and milk pipe-line.

2. A milking installation according to claim 1, comprising also a drain valve connected to the milk pipe line for draining cleaning liquid therefrom.

3. A milking installation according to claim 1, comprising also a hose manifold communicating with the milk pipe-line and adapted for connection to the hoses of a plurality of teat cup assemblies.

4. A milking installation according to claim 1, comprising also a removable plug covering one of said manifold openings.

5. A milking installation according to claim 1, comprising also adaptors removably mounted in at least some of the manifold openings for connecting the teat cups thereto.

6. A milking installation according to claim 1, in which the manifold is a hollow disc-shaped member having said openings in the top.

7. A milking installation according to claim 1, comprising also a pump, and a return conduit including said pump for returning cleaning liquid from the receiver to the tank.

References Cited in the file of this patent
UNITED STATES PATENTS
2,680,445   Hemminger _____ June 8, 1954